Aug. 27, 1968     J. C. ROACH     3,398,886
REFRIGERANT COMPRESSOR

Filed Sept. 21, 1966     2 Sheets-Sheet 1

INVENTOR.
JEROME C. ROACH
BY *Carl M. Lewis*
ATTORNEY

Aug. 27, 1968   J. C. ROACH   3,398,886
REFRIGERANT COMPRESSOR

Filed Sept. 21, 1966   2 Sheets-Sheet 2

INVENTOR.
JEROME C. ROACH
BY *Carl M. Lewis*
ATTORNEY

United States Patent Office 3,398,886
Patented Aug. 27, 1968

3,398,886
REFRIGERANT COMPRESSOR
Jerome C. Roach, La Crosse, Wis., assignor to The Trane Company, La Crosse, Wis., a corporation of Wisconsin
Filed Sept. 21, 1966, Ser. No. 581,042
11 Claims. (Cl. 230—206)

ABSTRACT OF THE DISCLOSURE

A refrigerant compressor having the expansible chamber of a gear type lubricant pump disposed inside the crankshaft in the area axially coextensive with the crankshaft journal.

---

Figure 1:
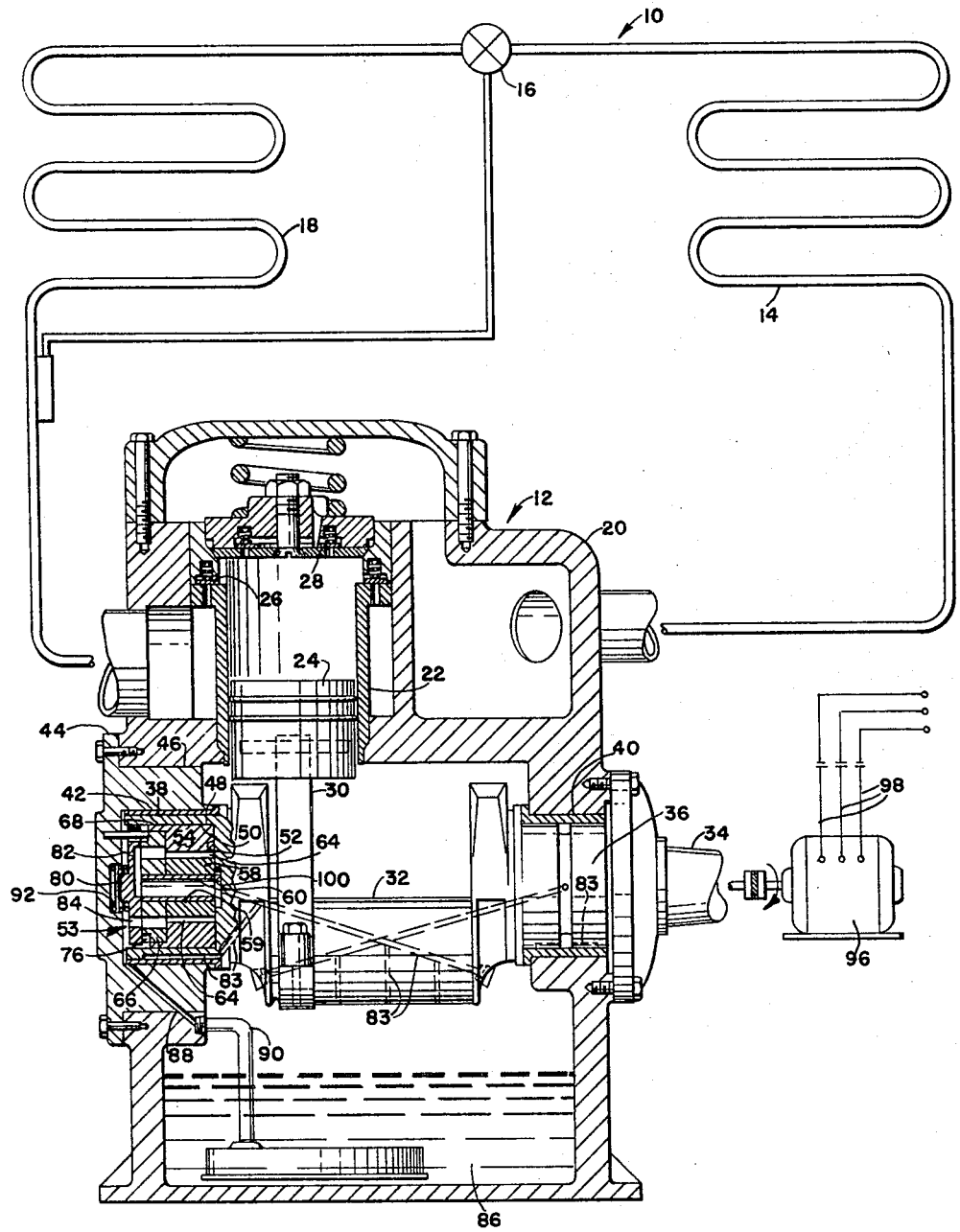

This invention relates to reciprocating refrigerant compressors and more particularly to lubricating systems therefor. Typically, reciprocating refrigerant compressors are provided with a lubricant pump located adjacent to and driven directly by one end of the compressor crankshaft. In the interest of minimizing the number of parts to reduce costs, it is common practice to mount the lubricant pump axially outward of a non-driven end of the crankshaft. However, such an arrangement adds materially to the overall axial length of the compressor. This is especially so when, in addition to the pump length, a pump reversing mechanism is required. A reversing mechanism is normally required to provide unidirectional lubricant flow in compressors adapted to be driven in either direction such as for example those driven by three phase motors which are likely to be connected for either direction of rotation. This additional compressor length is particularly undesirable when the compressor must be mounted in close quarters such as in compact unitary refrigeration apparatus and the like.

The instant invention provides a compact, low cost positive displacement lubricant pump mounted at and directly driven by the non-driven end of the compressor crankshaft which does not add materially to the compressor axial length thereby permitting compact installation of compressors in refrigeration equipment. Thus it is an object of this invention to provide a compact, light weight, low cost refrigerant compressor having an efficient positive displacement lubricating system.

In general the above objective is accomplished in the instant invention by incorporating a positive displacement expansible chamber lubricant pump internally of the non-driven end of the compressor crankshaft in an area axially coextensive with the crankshaft journal supporting that end. The instant invention involves a refrigerant compressor having a housing; a cylinder disposed within said housing; passage and valve means for admitting and discharging refrigerant gas to and from said cylinder; a piston slidably disposed within said cylinder for compressing refrigerant gas therein; first and second axially aligned main bearings supported by said housing; an elongated crankshaft disposed within said housing and having first and second axially aligned main journals rotatably mounted within said first and second axially aligned main bearings respectively; a crank on said crankshaft; a connecting rod pivotally connected to said piston and rotatably connected to said crank; means disposed in said crankshaft radially inwardly of and axially coextensive with said second main journal defining an expansible chamber for pumping lubricant to said first and second main journals; and first passage means in said crankshaft for conducting lubricant from said expansible chamber to one of said journals.

Figure 2:
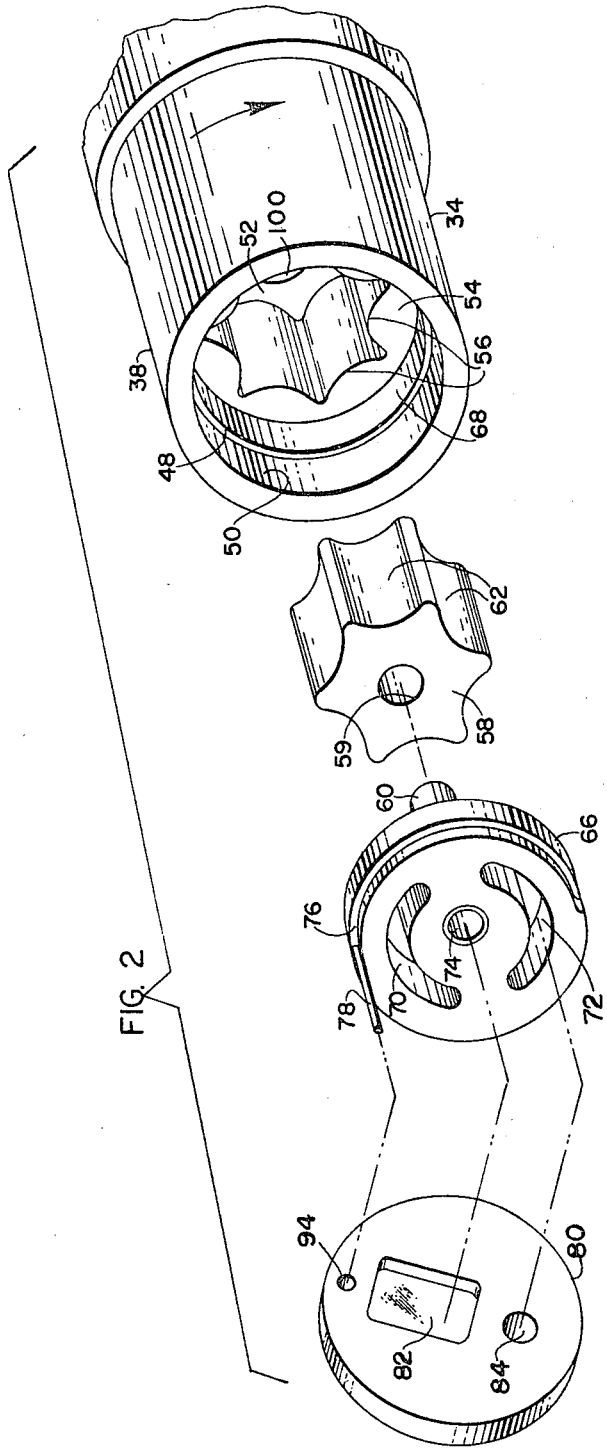

Other objects and advantages will become apparent as this specification proceeds to describe the invention in detail with reference to the accompanying drawing wherein like elements have been identified by like reference numerals in which:

FIGURE 1 illustrates diagrammatically a refrigeration system having a compressor shown in vertical section; and
FIGURE 2 is an enlarged exploded view of the non-driven end of the compressor crankshaft and certain lubricant pump parts of FIGURE 1.

Referring now to the drawings, there is shown a refrigeration system 10 having a refrigerant compressor 12, refrigerant condenser 14, refrigerant throttling means such as an expansion valve 16 and a refrigerant evaporator 18 connected respectively in series in a closed refrigerant circuit.

Compressor 12 has a housing 20 provided with a cylinder 22 having a piston 24 slidably disposed therein. Suction or inlet valve 26 communicates with evaporator 18 for admitting low pressure refrigerant gas to cylinder 22 upon downward movement of piston 24 while discharge or outlet valve 28 communicates with condenser 14 for discharging high pressure refrigerant from cylinder 22 to condenser 14 upon upward movement of piston 24.

Piston 24 is pinned to one end of a connecting rod 30 for pivotal movement therewith. The other end of connecting rod 30 is rotatably connected to the crank journal 32 of a crankshaft 34. Crankshaft 34 has first and second main journals 36 and 38 disposed in axial alignment. Journals 36 and 38 are rotatably mounted in bearings 40 and 42 respectively. Bearing 40 is supported directly by housing 20 while bearing 42 is supported by bearing head 44 which in turn is supported in aperture 46 of housing 20. Aperture 46 is of sufficient size to permit the installation of crankshaft 34 in housing 20.

The non-driven end of crankshaft 34 is provided with an axially extending recess 48 having a cylindrical surface 50 and an end wall 52 for receiving a positive displacement expansible chamber lubricant pump 53 therein. Pump 53 has an annular member 54 press fitted into recess 48. The cylindrical inner wall of annular member 54 is concentric with journal 38 and is provided with seven radially inwardly extending equally spaced lobes 56 (FIG. 2) disposed in axially coextensive relation to journal 38. A fluid displacement member 58 disposed radially inward of and axially coextensive with lobes 56 is mounted for rotation on sleeve 60 via axially extending central bore 59. The circumference of member 58 has six uniformly spaced bight portions 62 for sequentially receiving lobes 56 upon relative rotation of members 54 and 58. During relative rotation of members 54 and 58 the spaces 64 therebetween expand and contract whereby members 54 and 58 define a plurality of expansible chambers for pumping lubricant. Chambers 64 are closed at one end by end wall 52 of recess 48. The other end of chambers 64 is covered by port plate means in the form of a circular reversing port plate 66 which is axially coextensive with journal 38 and rotatably supported in an axially extending annular skirt portion 68 of annular member 54. Plate 66 has two diametrically opposed arcuate ports 70 and 72 extending axially therethrough and positioned to communicate with spaces 64. Reversing plate 66 has an eccentrically located aperture 74 into which sleeve 60 is press fitted. It will be understood that sleeve 60 and plate 66 may be integral if desired. The angular position of eccentricity of sleeve 60 and thus the angular position of eccentricity of displacement member 58 may be changed by rotation of plate 66. Plate 66 is further provided with a circumferential groove 76 extending approximately 180° for receiving the end of stop pin 78 which is anchored in bearing head 44. As a result of frictional drag, reversing port plate 66 tends to be rotated in whatever direction crankshaft 34 is rotated. However, the rotation of plate 66 is limited by the ends of groove 76 contacting pin 78. Thus upon a reversal of crankshaft rotation, reversing plate 66 is rotatably shifted about 180° thereby causing eccentrically located sleeve 60 and thus displacement member 58 to shift to the opposite side of the axis of rotation of the crankshaft 34. The aforementioned shifting of elements 60 and 58 has the effect of maintaining unidirectional flow in the lubricating system despite the reversal of rotational direction of the pumping elements. Thus in the example illustrated, the uppermost of ports 70 and 72 will always function as the discharge port while the lowermost of ports 70 and 72 will always function as the suction port of pump 53.

Pump 53 includes a second port plate 80 which is also axially coextensive with journal 38 and overlies one face of plate 66. Plate 80 has a discharge port 82 communicating the uppermost of ports 70 and 72 with the interior of sleeve 60 which in turn communicates with journals 32, 36 and 38 via passages 83 in crankshaft 34. A suction port 84 in plate 80 communicates the lowermost of ports 70 and 72 with the compressor lubricant sump 86 via passages 88 and 90. Port plate 80 is resiliently axially biased in slidable sealing contact with reversing port plate 66 via spring 92. Reversing port plate 66 is in turn biased axially in slidable sealing contact with members 54 and 58.

Port plate 80 also has an aperture 94 through which stop pin 78 extends for the purpose of preventing plate 80 from rotating.

In operation, crankshaft 34 may be drivingly connected to a three phase motor 96. Since the compressor disclosed is adapted to be driven in either direction, it is not necessary that the leads 98 of motor 96 be connected in any particular order to a source of three phase electrical power.

Assuming a direction of rotation indicated by the arrows in FIGURES 1 and 2, reversing port plate 66 will be rotatably shifted to a position wherein pin 78 contacts the end of groove 76 adjacent port 70. Lobes 56 of member 54 will drivingly engage the bight portions 62 of displacement member 58 thereby causing member 58 to rotate but at a lower rate than member 54. Lubricant will flow from sump 86, through passages 90, 88, port 84, port 72, into spaces 64, from whence it is discharged to flow through port 70, port 82, through sleeve 60, passages 83 to journals 32, 36 and 38.

Should the leads 98 of motor 96 be connected in such a way as to cause the compressor to be driven in the opposite direction; reversing port plate 66 will be rotated to a position in which the end of groove 76 adjacent port 72 contacts pin 78 thus shifting sleeve 60 and fluid displacement member 58 to a position on the opposite side of the crankshaft axis whereby lubricant is expressed from spaces 64 in the same direction despite the reversal of direction of members 54 and 58. Lubricant will thus flow from sump 86, through passages 90, 88, port 84, port 70, into spaces 64 from whence it is discharged to flow through port 72, port 82, through sleeve 60, passages 83 to journals 32, 36, and 38. It will be noted that wall 52 of recess 48 is provided with a recess 100 which communicates passages 83 with the interior of sleeve 60 when sleeve 60 is in either of the two extreme positions which it may assume.

During rotation of crankshaft 34, piston 24 is reciprocated via connecting rod 30 and refrigerant flows from evaporator 18, through suction valves 26 into cylinder 22 from whence it is discharged through discharge valve 28 and flows through condenser 14, expansion valve 16 back to evaporator 18 of refrigeration system 10.

Having thus described in detail the preferred embodiment of my invention, I contemplate that many changes may be made without departing from the scope or spirit of my invention and I desire to be limited only by the claims.

I claim:

1. A refrigerant compressor comprising: a housing; a cylinder disposed within said housing; passage and valve means for admitting and discharging refrigerant gas to and from said cylinder; a piston slidably disposed within said cylinder for compressing refrigerant gas therein; first and second axially aligned main bearings supported by said housing; an elongated crankshaft disposed within said housing and having first and second axially aligned main journals rotatably mounted within said first and second axially aligned main bearings respectively; a crank on said crankshaft; a connecting rod pivotally connected to said piston and rotatably connected to said crank; means, disposed in said crankshaft radially inwardly of and axially coextensive with that portion of the surface of said second main journal which is axially coextensive with said second main bearing, defining an expansible chamber for pumping lubricant to at least one of said first and second main journals; and first passage means in said crankshaft for conducting lubricant from said expansible chamber to one of said journals.

2. The apparatus as defined in claim 1 wherein said means for defining an expansible chamber includes an annular wall circumscribing the axis of said second main journal and disposed radially inward of and axially coextensive with said surface of said second main journal.

3. The apparatus as defined by claim 2 wherein said means for defining an expansible chamber further includes a fluid displacement member disposed eccentrically of and radially inward of said annular wall and axially coextensive with said surface of said second main journal thereby defining at least one lubricant receiving cavity in the space between said fluid displacement member and said annular wall.

4. The apparatus as defined by claim 3 wherein said annular wall is substantially concentric with said second main journal.

5. The apparatus as defined by claim 3 wherein said annular wall has a number of uniformly spaced salient portions extending radially inwardly; and said displacement member has a number of bight portions for receiving said salient portions upon relative rotation of said annular wall and displacement member.

6. The apparatus as defined in claim 5 wherein the number of said bight portions is one less than the number of said salient portions.

7. The apparatus as defined by claim 3 including a first port plate means having first and second ports therein for respectively axially conducting lubricant fluid to and from said space between said displacement member and said annular wall; said first port plate means being disposed radially inward of and axially coextensive with said surface of said second main journal; and means resiliently biasing said first port plate means axially toward said displacement member and toward said means defining said annular wall.

8. The apparatus as defined by claim 7 including means rotatably supporting said first port plate means; stop means for limiting the rotation of said port plate means to less than 360° thereby limiting the rotation of said first port plate means to two extreme positions whereby rotation of said first port plate means from one extreme position to the other extreme position interchanges the positions of first and second ports.

9. The apparatus as defined by claim 8 including a second port plate having a face abutting said first port plate means; a second passage means extending axially through said first port plate means and through said displacement member communicating with said first passage means in said crankshaft; and an outlet port in said second port plate for conducting fluid from the port in said first port plate means functioning as a discharge port to said second passage means; and means locating at least a portion of said second port plate radially inward of and axially coextensive with said surface of said second main journal.

10. A refrigerant compressor comprising: a housing; a cylinder disposed within said housing; passage and valve means for admitting and discharging refrigerant gas to and from said cylinder; a piston slidably disposed within said cylinder for compressing refrigerant gas therein; first and second axially aligned main bearings supported by said housing; an elongated generally horizontal crankshaft disposed within said housing and having first and second axially aligned main journals rotatably mounted within said first and second axially aligned main bearings respectively; a crank on said crankshaft; a connecting rod pivotally connected to said piston and rotatably connected to said crank; said crankshaft having a recess therein extending horizontally from one end thereof; an expansible chamber lubricant pump disposed in said recess radially inwardly of and axially coextensive with that portion of the surface of said second main journal which is axially coextensive with said second main bearing, for pumping lubricant to said first and second main journals; and passage means in said crankshaft for conducting lubricant from said pump to one of said journals.

11. A refrigerant compressor comprising: a housing; a cylinder disposed within said housing; passage and valve means for admitting and discharging refrigerant gas to and from said cylinder; a piston slidably disposed within said cylinder for compressing refrigerant gas therein; first and second axially aligned main bearings supported by said housing; an elongated crankshaft disposed within said housing and having first and second axially aligned main journals rotatably mounted within said first and second axially aligned main bearings respectively; a crank on said crankshaft; a connecting rod pivotally connected to said piston and rotatably connected to said crank; a reversible expansible chamber lubricant pump disposed in said crankshaft radially inwardly of and axially coextensive with that portion of the surface of said second main journal which is axially coextensive with said second main bearing, for pumping lubricant to said first and second main journals; and passage means in said crankshaft for conducting lubricant from said pump to one of said journals.

References Cited

UNITED STATES PATENTS

| | | | |
|---|---|---|---|
| 2,225,228 | 12/1940 | Neeson | 230—206 |
| 2,274,943 | 3/1942 | Touborg | 230—206 |
| 2,485,417 | 10/1949 | Steenstrup | 230—206 |
| 2,490,391 | 12/1949 | Wentling | 103—126 |
| 2,829,602 | 4/1958 | Witchger | 103—126 |
| 2,844,305 | 7/1958 | Becht et al. | 230—206 |
| 3,165,066 | 1/1965 | Phelps et al. | 103—126 |
| 3,307,480 | 3/1967 | Kropiwhicki | 103—3 |

ROBERT M. WALKER, *Primary Examiner.*